(12) United States Patent
Yamazaki

(10) Patent No.: US 8,295,145 B2
(45) Date of Patent: Oct. 23, 2012

(54) OPTICAL PICKUP DEVICE AND OPTICAL DISC APPARATUS

(75) Inventor: Kazuyoshi Yamazaki, Kawasaki (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 801 days.

(21) Appl. No.: 12/341,203

(22) Filed: Dec. 22, 2008

(65) Prior Publication Data
US 2009/0168618 A1    Jul. 2, 2009

(30) Foreign Application Priority Data
Dec. 26, 2007   (JP) ................. 2007-333443

(51) Int. Cl.
*G11B 7/12* (2012.01)
(52) U.S. Cl. ............... 369/112.12; 369/112.19; 359/571
(58) Field of Classification Search ................ None
See application file for complete search history.

(56) References Cited

U.S. PATENT DOCUMENTS

| | | | |
|---|---|---|---|
| 7,227,819 B2 * | 6/2007 | Kadowaki et al. | 369/44.41 |
| 2005/0002014 A1 | 1/2005 | Kobayashi | |
| 2006/0193235 A1 * | 8/2006 | Murata et al. | 369/112.03 |
| 2007/0183279 A1 | 8/2007 | Nishikawa | |

FOREIGN PATENT DOCUMENTS

| | | |
|---|---|---|
| CN | 1493076 | 4/2004 |
| JP | 08-063761 | 3/1996 |
| JP | 2001-344804 | 12/2001 |
| JP | 2002-100063 | 4/2002 |
| JP | 2004-281026 | 10/2004 |
| JP | 2006-155743 | 6/2006 |
| JP | 2007-207381 | 8/2007 |

OTHER PUBLICATIONS

Office Action in JP 2007-333443, mailed Aug. 23, 2011, (in Japanese, 3 pgs), with partial English translation of Office Action (1 pg).

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

An optical pickup device divides signal light so as to detect the divided signal light. For example, a photodetector can include a region "A" and another region "B." Among diffracted light diffracted from a track on an optical disc, only zeroth-order diffraction light enters region "A", whereas the zeroth-order diffraction light, + first-order diffraction light, and − first-order diffraction light enter region "B". A focusing error signal from the photodetector is produced based upon a signal detected by the photodetector, whereas a tracking error signal is produced based upon signals detected from the regions "A" and "B." A stable focusing error signal and a stable tracking error signal can be detected with respect to a dual layer optical disc, or a multi layer optical disc.

9 Claims, 14 Drawing Sheets

OPTICAL PICKUP DEVICE AND OPTICAL DISC APPARATUS

INCORPORATION BY REFERENCE

The present application claims priority from Japanese application JP 2007-333443 filed on Dec. 26, 2007, the content of which is hereby incorporated by reference into this application.

BACKGROUND OF THE INVENTION

The present invention is related to an optical pickup device and an optical disc apparatus.

As background techniques in the related technical field, for instance, JP-A-2004-281026 has been disclosed. That is, JP-A-2004-281026 has described the following problem: While the variation amount of the TE signal amplitudes is defined as ΔPP=(amplitude "a"−amplitude "b")/(amplitude "a"+amplitude "b"), in such a case that the TE signal is detected by the above-described conventional structure, the variation amount "ΔPP" is 0.69; the offset "oft1" is +33 nm; and the offset "oft2" is −33 nm, namely, which represent the large values. As previously described, if the variation amount "ΔPP" of the TE signal amplitudes is largely varied, then the gain of the tracking control is lowered in the track "Tn−1" and the track "Tn." As a result, there is such a problem that the tracking control becomes unstable, and thus, information cannot be recorded and reproduced in high reliability. As the solving ways, JP-A-2004-281026 has described the below-mentioned technical idea: A still further optical information apparatus related to the present invention is featured by comprising: an optical source for emerging an optical beam; a light collecting unit for collecting the optical beam emitted from the light source onto an optical storage medium having a track; a branching unit for branching optical beams reflected/diffracted on the optical storage medium; a dividing unit for dividing the branched optical beam based upon a plurality of regions; an optical detecting unit having a plurality of detection regions which detects the optical beams divided by the dividing unit and outputs current signals in response to detected light amounts; a plurality of converting units for converting the current signals outputted from the optical detecting unit into voltage signals; and also, a tracking error signal producing unit for producing a tracking error signal in such a manner that while such a region which mainly contains a tracking error signal component is defined as a first region, and another region which mainly contains an offset component of the tracking error signal among the plurality of regions arranged in the dividing unit, the voltage signal derived from the second region is multiplied by a coefficient, and then, the coefficient-multiplied voltage signal is subtracted from the voltage signal derived from the first region; in which an efficiency under which the optical beams passed through the second region reach the optical detecting unit is high, as compared with another efficiency under which the optical beams passed through the first region reach the optical detecting unit.

SUMMARY OF THE INVENTION

Generally speaking, in optical pickup devices, since optical spots are correctly irradiated onto predetermined recording tracks located within optical discs, objective lenses are shifted along focusing directions by detecting focusing error signals in order to perform focusing controls of the objective lenses along the focusing direction, and the objective lenses are shifted along a radial direction of disc-shaped recording media by detecting tracking error signals in order to perform tracking controls. The positional controls for the objective lenses are carried out by these signals.

The above-described JP-A-2004-281026 has described the following technical ideas. That is, a single optical beam is irradiated onto an optical disc, and then, light diffracted from the optical disc is divided by a diffraction grating into a plurality of diffraction light which are detected. As a consequence, even when a dual layer disc (disc having two layers of recording planes) is employed, stable tracking controls can be carried out. However, in the structure of JP-A-2004-281026, there is such a problem that noises may be produced in focusing error signals.

Accordingly, an object of the present invention is to provide an optical pickup device and an optical disc apparatus, which are capable of performing a stable focusing control operation and a stable tracking control operation with respect to an optical disc having two or more layers of recording planes, being capable of reducing noises contained in focusing error signals.

The above-described object can be achieved by the inventive ideas of the present invention recited in the claims. A simple explanation is made as follows of a typical inventive idea within various inventive ideas disclosed in the present invention.

An optical pickup device, according to an aspect of the present invention, is featured by comprising: a semiconductor laser element; an objective lens which collects optical beams emitted from the semiconductor laser element so as to irradiate the collected optical beam onto an optical disc; an actuator which moves the objective lens in order that the collected optical beam is irradiated onto a predetermined position on the optical disc; and a photodetector which receives the optical beam diffracted from a track of the optical disc; in which the photodetector is provided with a light receiving part having four regions, namely, a first region, a second region, a third region, and a fourth region; the first region and the third region are located in a line symmetrical manner with respect to a center axis of the light receiving part; the second region and the fourth region are located in a line symmetrical manner with respect to the center axis of the light receiving part; even when the second region and the fourth region are separated far from the center axis of the light receiving part, the widths of both the second region and the fourth region are equal to each other, or the widths thereof gradually become narrower in accordance with separation distances from the center axis of the light receiving part; among the diffraction light diffracted from the track on the optical disc, zeroth-order diffraction light enters to the first region and the third region; the zeroth-order diffraction light, + first-order diffraction light, and − first-order diffraction light enter to the second region and the fourth region; and a focusing error signal acquired from the optical disc in accordance with an astigmatic detection method is produced based upon signals detected from the first region and the third region.

In accordance with the present invention, the optical pickup device and the optical disc apparatus for mounting thereon the optical pickup device can be provided, which are capable of acquiring the stable servo signals in such a case that information is recorded and/or reproduced with respect to an information recording medium having a plurality of information recording planes.

These and other features, objects and advantages of the present invention will become more apparent from the following description when taken in conjunction with the accompanying drawings.

DETAILED DESCRIPTION OF THE INVENTION

Referring now to drawings, a description is made of various embodiments according to the present invention.

First Embodiment

Figure 5:
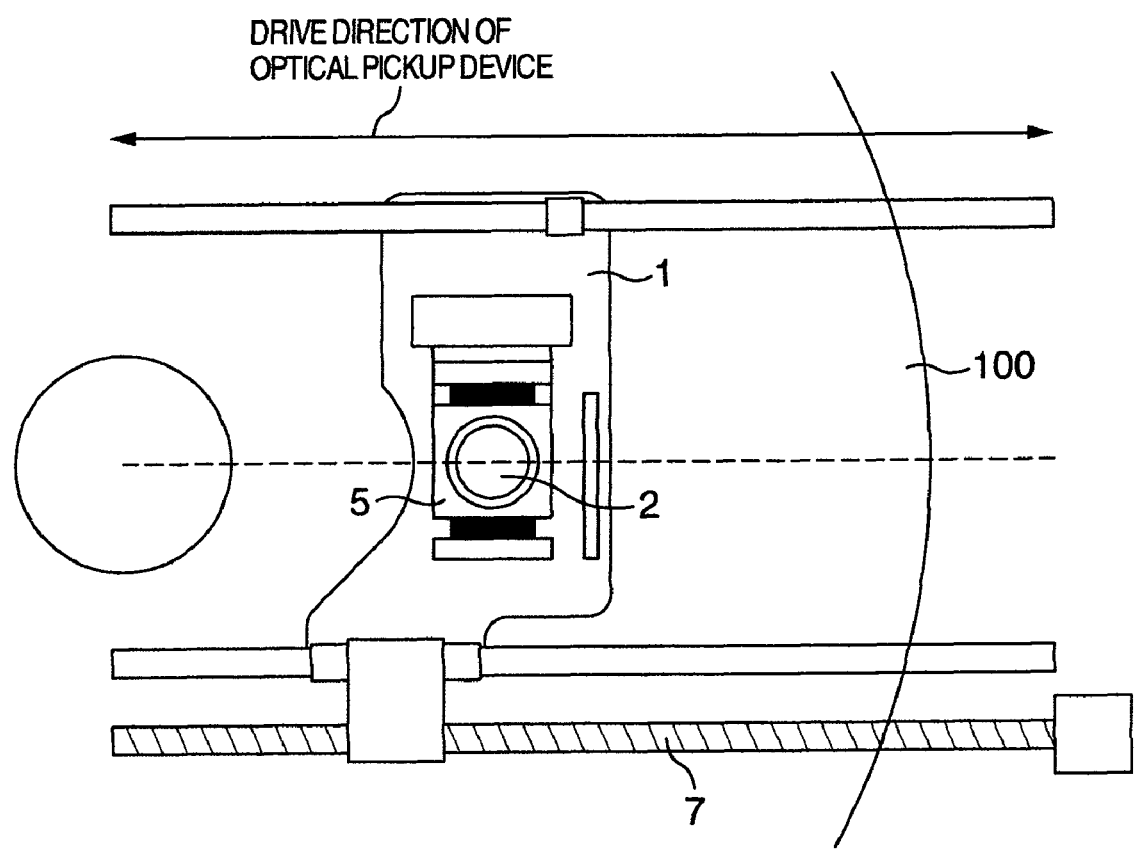
FIG. 5 is an explanatory diagram for explaining an arrangement of an optical pickup device and an optical disc, according to a first embodiment of the present invention.

FIG. 5 is a schematic structural diagram for indicating one example of an optical pickup device according to a first embodiment of the present invention.

As shown in FIG. 5, the optical pickup device 1 has been constructed in such a manner that the optical pickup device 1 can be driven by a drive mechanism 7 along a radial direction of an optical disc 100. While an objective lens 2 has been mounted on an actuator 5 installed on the optical pickup device 1, light (optical beam) is irradiated from the objective lens 2 onto the optical disc 100. The light emitted from the objective lens 2 forms a spot (optical spot) on the optical disc 100, and then, is reflected from the optical disc 100. Since this reflected light is detected, a focusing error signal and a tracking error signal are produced.

Figure 6:
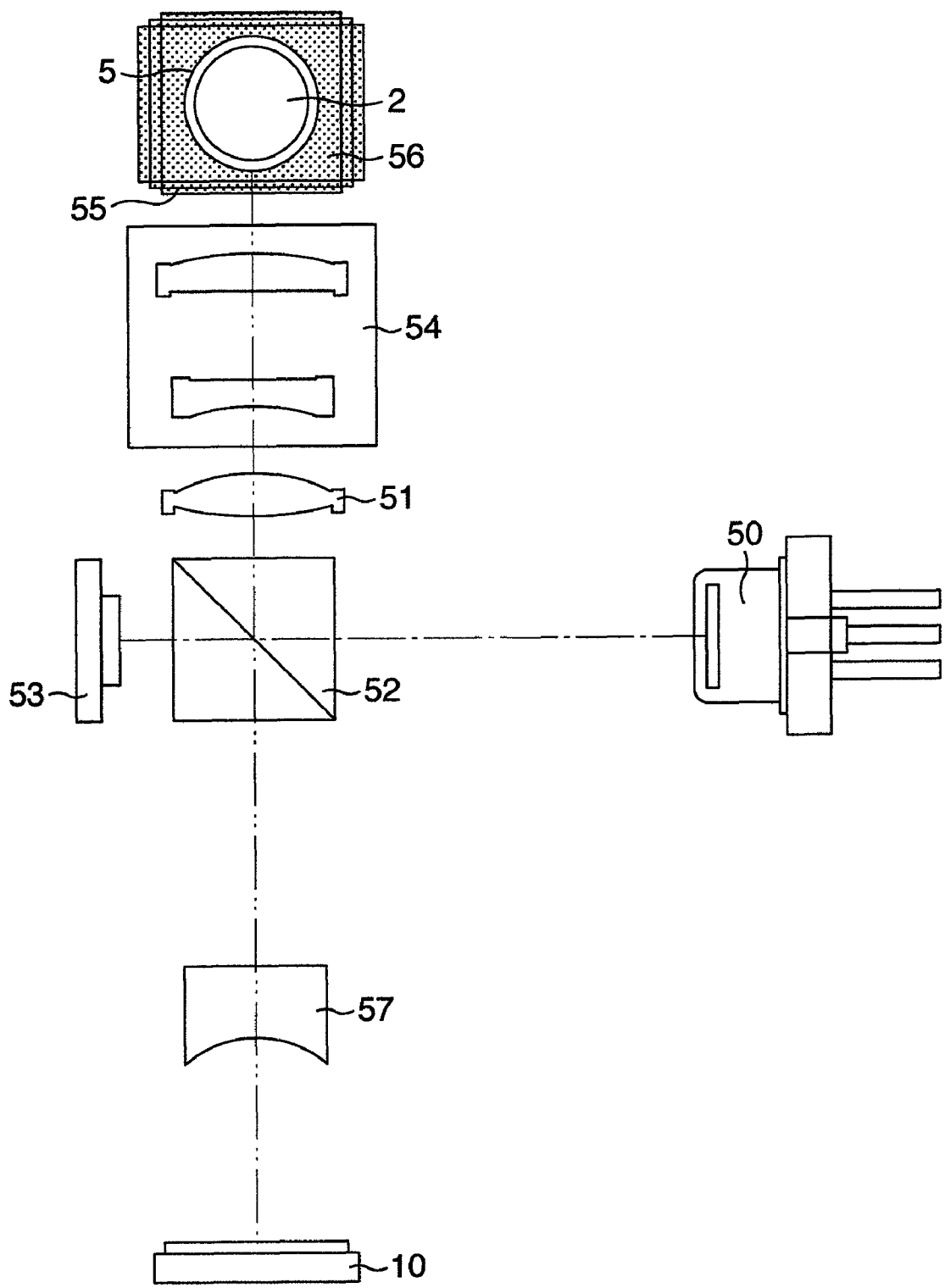
FIG. 6 is an explanatory diagram for explaining an optical system employed in the optical pickup device of the first embodiment.

In the above-described optical pickup device 1, FIG. 6 indicates an optical system. It should be understood that, although a description will be made of a BD (Blu-ray Disc), any sorts of other discs such as HD DVD discs which are driven by other recording methods may be employed.

An optical beam having a wavelength of approximately 405 nm is emitted from a semiconductor laser element 50 as diverging light. The optical beam emitted from the semiconductor laser element 50 is reflected on a beam splitter 52. It should be noted that a portion of the optical beam passes through the beam splitter 52 and then enters to a front monitor 53. Generally speaking, in such a case that information is recorded on a recording type optical disc such as BD-RE and BD-R, a light amount of semiconductor laser light is required to be controlled in high precision in order that a predetermined light amount is irradiated onto a recording plane of such a recording type optical disc. To this end, when a signal is recorded on a recording type optical disc, the front monitor 53 detects a change in light amounts of the semiconductor laser element 50, and then, feeds back the detected light amount change to a drive circuit (not shown) of the semiconductor laser element 50. As a consequence, the light amounts on the recording type optical disc can be monitored.

An optical beam reflected on the beam splitter 52 is converted into a substantially parallel optical beam by a collimating lens 51. The optical beam passed through the collimating lens 51 enters to a beam expander 54. The beam expander 54 is utilized in order that spherical aberration is compensated by changing diverging/converging statuses of the optical beam, while the spherical aberration is caused by a thickness error of cover layers of the optical disc 100. The optical beam emitted from the beam expander 54 is reflected on a reflection mirror 55, and the reflected optical beam passes through a quarter wave ($\frac{1}{4}\lambda$) plate 56, and thereafter, the passed optical beam is collected on the optical disc 100 by an objective lens 2 mounted on the actuator 5.

On the other hand, an optical beam reflected on the optical disc 100 passes through the objective lens 2, the quarter wave plate 56, the reflection mirror 55, the beam expander 54, the collimating lens 51, and the beam splitter 52. The optical beam passed through the beam splitter 52 enters via a detecting lens 57 to a detector 10. At this time, since predetermined astigmatic aberration is given to this optical beam by the detecting lens 57, the above-described optical system has been arranged in such a manner that a focusing error signal can be detected by the astigmatic detection method.

First of all, a description is made of a problem occurred when a tracking error signal is detected. As a general-purpose tracking error signal detecting method, a differential push-pull system (will be abbreviated as "DPP system") is known. In this DPP system, an optical beam is divided into a main beam, a + first-order sub-beam, and a − first-order sub-beam by a diffraction grating; a push-pull (MPP) signal obtained from the main beam of a radial direction, a sub push-pull (SPP) signal obtained from the + first-order sub-beam and the − first-order sub-beam are calculated in accordance with the below-mentioned calculation equation (1) so as to reduce a DC offset:

$$DPP = MPP - K \times SPP \qquad [\text{Equation 1}]$$

It should also be noted that "K" represents a coefficient for correcting a ratio of a light amount of the main beam with respect to a light amount of the sub-beams.

However, when the DPP system is carried out, a problem may occur in such a case that a dual layer disc such as BD and HD DVD disc is reproduced. Now, a description is made of this problem.

A dual layer disc corresponds to such an optical disc that two sets of recording planes are present, and reflected light is produced from each of these recording planes. As a result, in a dual layer disc, an optical beam is separated into two optical beams by the dual layer optical disc, and these two separated optical beams travel through two optical paths, and then, enter to a detector. For instance, in such a case that an optical beam is focused on a single layer (single recording plane), this optical beam forms a spot (signal light) on a plane of the detector, and another optical beam (namely, stray light) reflected on the other layer (the other recording plane) enters to the plane of the detector under blurring condition. At this time, the signal light (spot) and the stray light reflected on the plane of the detector overlap with each other on the plane of the detector, so that interference occurs. Originally, optical beams emitted from a laser element having the same frequency are not changed with time. However, since intervals of the respective layers of an optical disc are changed due to rotations of the optical disc, a phase relationship between the two optical beams is changed with time, which may induce a variation of DPP signals corresponding to a tracking error signal. This variation of the DPP signals is mainly and largely caused by SPP signals. Generally speaking, a spectral ratio of the main beam with respect to the + first-order sub-beam and the − first-order sub-beam is 10:1:1 to 20:1:1, and the light amounts of the + first-order sub-beam and the − first-order sub-beam are small with respect to the light amount of the main beam. As a result, interference between the signal light of the sub-beams and the stray light of the main beam may largely occur with respect to the signal light. Since the interference is known in this technical field, explanations thereof will be omitted. As a consequence, the SPP signal is largely varied so that the DPP signal corresponding to the tracking error signal is largely varied. If the variation of the tracking error signals occurs, then a spot (signal light) optically formed on the optical disc cannot trace along a track. As a result, a deterioration problem with respect to recording/reproducing signals mainly occur.

With respect to the above-described deterioration problem, JP-A-2004-281026 has disclosed the below-mentioned technical solving ideas. That is, while a single spot is formed on an optical disc, reflected light of this spot is divided into a plurality of regions so as to separate this reflected light into signal light and stray light, and then, since the separated signal light is detected, a tracking error signal can be detected in a stable manner. Also, since both the focusing error signal and an RF signal which constitutes a reproduction signal are detected at the same time, the focusing error detection of the astigmatic detection method has been employed. However, the astigmatic detection method has such a problem that a noise component may be produced in the focusing error signal due to a plane shift of a detector along a tangential direction and also astigmatic aberration. A basic idea as to the astigmatic detection method will now be simply described.

Figure 1:
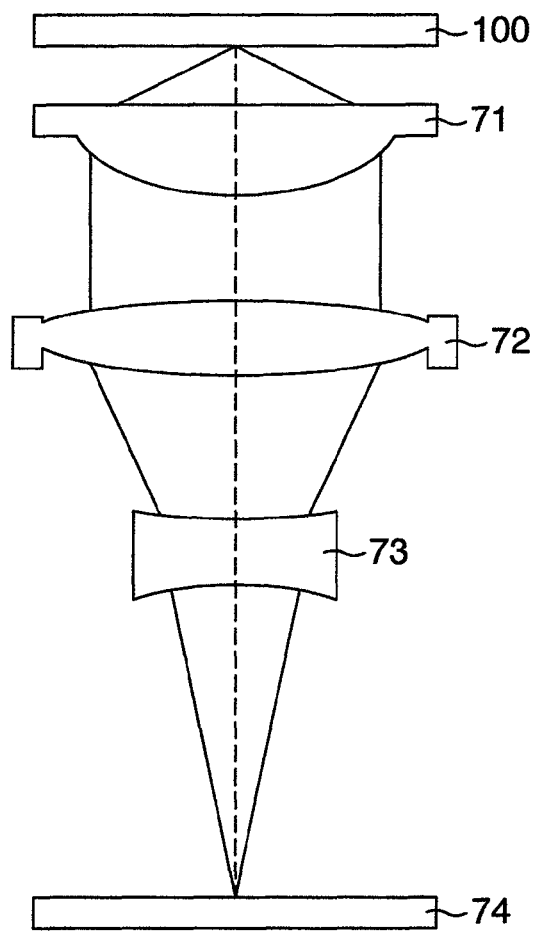
FIG. 1 is an explanatory diagram for explaining an astigmatic detection method for detecting a focusing error signal.
Figure 2A:
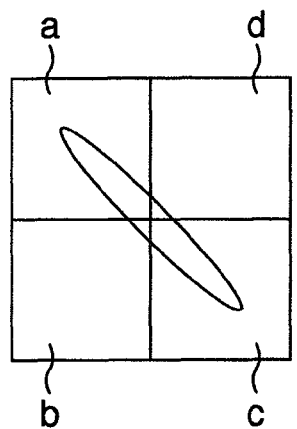
FIG. 2A to FIG. 2C are explanatory diagrams for explaining another astigmatic detection method for detecting a focusing error signal.
Figure 2B:
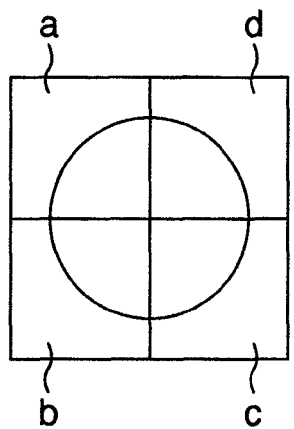
Figure 2C:
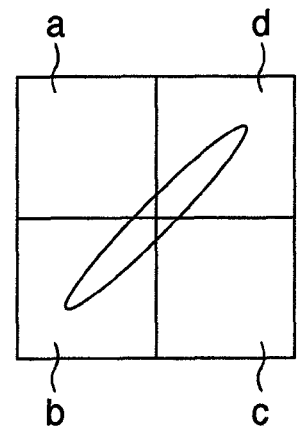

FIG. 1 illustratively shows a detection system of an astigmatic detection method. An optical beam is reflected on the optical disc 100, and then, the reflected optical beam passes through an objective lens 71, a collimating lens 72, and a detecting lens 73, and thereafter, enters to a detector 74. When an attention is paid to detection of a focusing error signal, since the detecting lens 73 has a cylindrical plane, a shape of a spot on a detection part of the detector 74 when an optical spot on the optical disc 100 is correctly focused becomes a circular shape, as indicated in FIG. 2B. In contrast thereto, when a spot on the optical disc 100 is not focused, a spot on the detection part of the detector 74 becomes such a spot having an elliptical shape along a diagonal direction thereof, as represented in FIG. 2A and FIG. 2C. It should also be noted that FIG. 2A shows such a status that the objective lens 71 approaches the optical disc 100 closer than the focusing position, whereas FIG. 2C indicates such a status that the objective lens 71 is separated far from the focusing position.

In this case, a focusing error signal (FES) is expressed by the below-mentioned calculation equation (2):

$$FES = (A+C) - (B+D) \quad \text{[Equation 2]}$$

It should also be understood that "A", "B", "C", and "D" represent strengths of signals acquired from respective detection parts "a", "b", "c", and "d", respectively. Since the signal light is detected in the above-described manner, the focusing error signal can be obtained.

Figure 3:
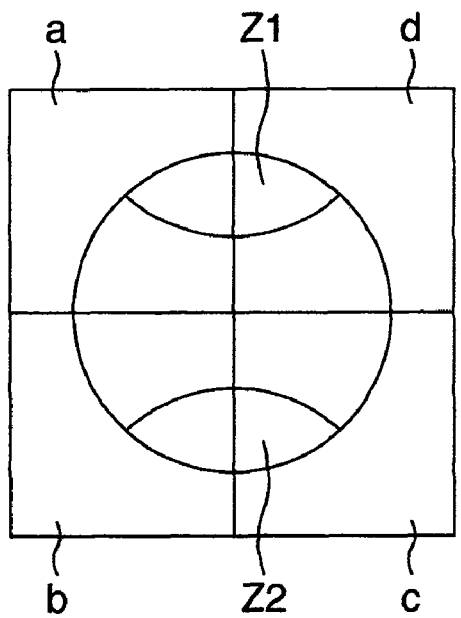
FIG. 3 is an explanatory diagram for explaining a leakage-in when a focusing error signal is detected.

However, as previously explained, the astigmatic detection method has such a problem that the noise component may be produced in the focusing error signal due to the plane shift of the detector along the track tangential direction and also the astigmatic aberration. This problem will now be described as follows:

As to spots entered to the detector 74, in addition to the signal light reflected on the optical disc 100, diffracted light which was diffracted from a groove of the optical disc 100 also enters to the detector 74. As a result, interference between the signal light and the diffraction light may occur. FIG. 3 indicates an interference status under which the signal light reflected on the optical disc 100 interferes with the diffraction light diffracted from the optical disc 100. A region "Z1" and another region "Z2" are interference regions. If an entire region containing the interference regions is detected in accordance with the below-mentioned calculation equation (3), then a push-pull (PP) signal corresponding to the tracking error signal (TES) may be obtained:

$$TES = (A+B) - (C+D) \quad \text{[Equation 3]}$$

This PP signal corresponds to a groove across signal which is produced when the optical beam crosses the groove, and corresponds to such a signal which is required in order that the optical beam traces a track formed on the optical disc. However, a fact that this PP signal is produced in a focusing error signal may constitute a problem.

Figure 4A:
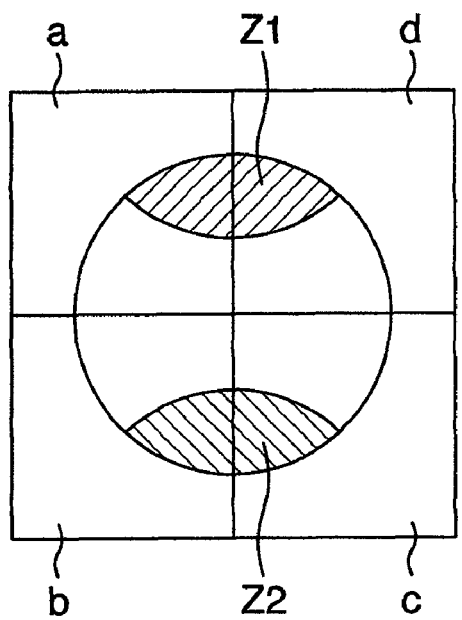
FIG. 4A and FIG. 4B are explanatory diagrams for explaining a leakage-in when a focusing error signal is detected.
Figure 4B:
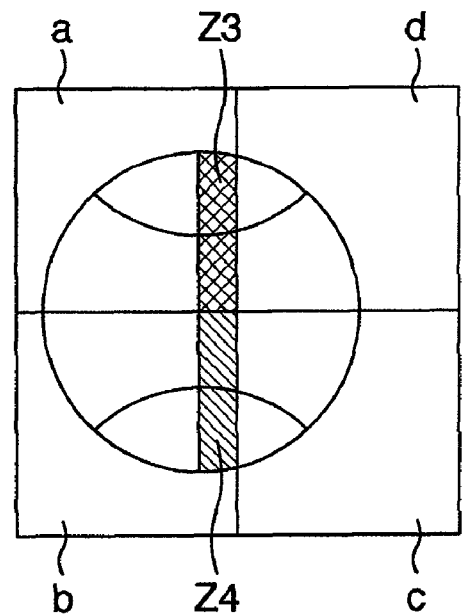

In this case, FIG. 4A and FIG. 4B represent detection parts on the detector 74 when a spot on the optical disc is focused. FIG. 4A shows such a case that the spot enters to a center of the detector 74, and FIG. 4B indicates such a case that the spot enters being shifted along a direction corresponding to a tangential direction of the optical disc. As represented in FIG. 4A, with respect to a focusing error signal at the spot entered to the detector center, if "A" is subtracted from "B", then it becomes 0, and if "C" is subtracted from "D", then it becomes 0, so that a push-pull signal is not detected. To the contrary, as shown in FIG. 4B, when the detector plane shift occurs with respect to the spot, even if "A" is subtracted from "B", and even if "C" is subtracted from "D", then such a region that the region "Z3" corresponds to the region "Z4" is left. As a result, the signal of the region "Z3" is subtracted from the signal of the region "Z4", so that although a DC-like offset is not produced, an AC-like signal corresponding to the PP signal is detected. This AC-like signal becomes a noise component (will be referred to as "leak-in component" hereinafter). As a result, when the spot seeks tracks of the optical disc 100, the focusing servo operation cannot be traced. Thus, there is such a problem that the relevant circuit is oscillated.

Also, in the case that the astigmatic aberration occurs, when a focusing control operation is performed, the shape of the spot on the detection plane of the detector 74 is not a circle, but becomes elliptical. As a result, a so-called "leakage-in component" occurs. As previously explained, when the detector plane shift and the astigmatic aberration occur, there is such a problem that the focusing servo control is oscillated.

Moreover, very recently, BD and HD DVD discs of organic dye, practical uses of which have been expected and which may be manufactured in low cost, correspond to such discs that modulation degrees of PP signals are large. As a result, leaking of groove across signals to focusing error signals is further increased.

As a consequence, in the structure of the optical system described in JP-A-2004-281026, leaking of the groove across signal in the focusing error signal may constitute a problem. In order to optically reduce this leakage-in problem, the adjusting precision of the optical pickup device must be improved, which may increase the manufacturing cost. However, if the detector is shifted due to aging effects of the structure of the optical system, then the leakage-in of the groove across signal may occur, which necessarily requires a fundamental solution.

In view of an aspect capable of reducing the leaking of the groove across signal in the focusing error signal, JP-A-8-063761 has disclosed one technical solving idea. In this technical solving idea, both the region 1 and the region 2, which correspond to the interference regions depending upon the tracks on the optical disc, are not detected as the focusing error signal. It should be understood that in such an optical system structure as described in JP-A-8-063761, when the objective lens is shifted, since the interference regions enter to the regions which are detected by the focusing error signal, it is obvious that leakage-in of the groove across signal in the focusing error signal may occur. At the same time, there is another problem when the tracking error signal is detected. In the optical system of JP-A-8-063761, either a 1-beam structure or a 3-beam structure may be assumed. When the 1-beam structure is employed, JP-A-8-063761 has described such a technical idea that the tracking error signal is detected by differentially processing the regions containing the region 1 and the region 2 which correspond to the interference regions. However, when the intensity distribution of the optical beam is considered, in an actual case, a DC offset may be produced in connection with the shift of the objective lens. As a result, there is such a problem that the tracking control operation cannot be carried out in the stable manner. Also, to the contrary, in such a case that the 3-beam structure is employed (DPP system) in order to suppress the DC offset caused by the shift of the objective lens, as previously explained, since the tracking error signal is varied on the dual layer disc, the above-described problem may occur.

As previously described, in the structures of the optical systems disclosed in JP-A-2004-281026 and JP-1A-8-063761, there is such a problem that the servo signal detecting system capable of satisfying the focusing error signals and the tracking error signals cannot be established in dual layer discs of BD, and the like.

Figure 7:
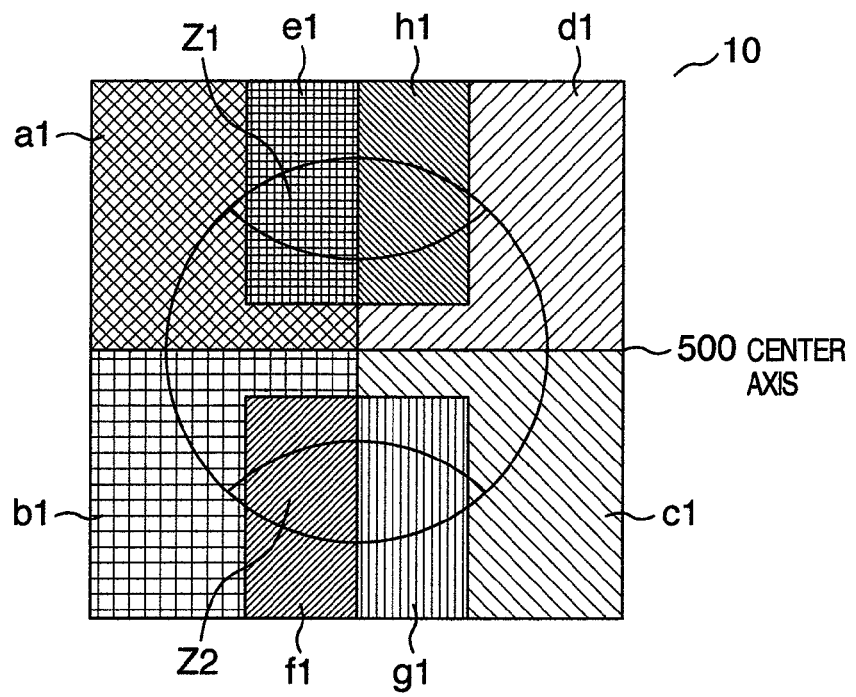
FIG. 7 is a diagram for illustratively showing a light receiving part employed in the optical system of the first embodiment.

In order to solve the above-described problem, in accordance with the first embodiment, as one example, a detector 10 having such a structure is employed in which an entire light receiving parts thereof is divided into eight sub-divided regions, as represented in FIG. 7. In the detector 10 shown in FIG. 7, only zeroth-order diffraction light among diffracted light which is diffracted from the tracks on an optical disc is irradiated onto a region which is constituted by detection parts "a1" and "d1" (first region), and also, detection parts "b1" and "c1" (third region), whereas the zeroth-order diffraction light, the + first-order diffraction light, and the − first-order diffraction light are irradiated onto other regions which is constituted by detection parts "e1" and "h1" (second region), and also detection parts "f1" and "g1" (fourth region). The first region and the third region are located in a line symmetrical manner with respect to a center axis 500. Also, the second region and the fourth region are located in a line symmetrical manner with respect to the center axis 500. In this example, the center axis 500 implies such a straight line which passes through a center of the entire light receiving part of the detector 10 and is located parallel to one edge of the entire light receiving part. Also, when an optical pickup device has been assembled in an optical disc drive, this center axis 500 has been directed along a direction located perpendicular to a radial direction of tracks of the optical disc. As indicated in FIG. 7, the first region to the fourth region have been arranged in such a manner that both the first region constituted by the detection parts "a1" and "d1", and the third region constituted by the detection parts "b1" and "c1" are contacted to the center axis 500, whereas both the second region constituted by the detection parts "e1" and "h1", and the fourth region constituted by the detection parts "f1" and "g1" are not contacted to the center axis 500.

In addition, signals "A1", "B1", "C1", "D1", "E1", "F1", "G1", and "H1", which are acquired from the detection parts "a1", "b1", "c1", "d1", "e1", "f1", "g1", and "h1" of the detector 10 are calculated based upon the below-mentioned calculation equations (4) so as to produce a focusing error signal (FES), a tracking error signal (TES), and an RF signal.

$$FES=(A1+C1)-(B1+D1)$$

$$TES=\{(E1+H1)-(F1+G1)\}-kt1\times[(A1+D1)-(B1+C1)\}$$

$$RF=A1+B1+C1+D1+E1+F1+G1+H1[ \quad \text{Equation 4}]$$

It should also be noted that "kt1" represents a coefficient which causes that a DC component is not produced in a tracking error signal when an objective lens is shifted.

As apparent from the above-described calculation, the region 1 and the region 2, which correspond to the interference regions depending upon the tracks on the optical disc, are not employed as detection signals for detecting the focusing error signal. As a result, detection for stable focusing error signal with less leakage-in can be carried out. Also, even when the objective lens is shifted, the interference regions are not detected as the focusing error signals. As a result, even when the objective lens is shifted, the detection for the stable focusing error signal with less leakage-in can be carried out.

As to the tracking error signal, a signal of (E1+H1)−(F1+G1) produces an AC component and a DC component with respect to the shift of the objective lens, whereas another signal of (A1+D1)−(B1+C1) produces only a DC component. As a consequence, even when the objective lens is shifted, such a stable tracking error signal can be obtained by which the DC component is not produced. Also, since such a sub-signal employed in the DPP system is not employed in this example, an adverse influence of the interference signal caused by the dual layer disc can be hardly received.

Figure 8:
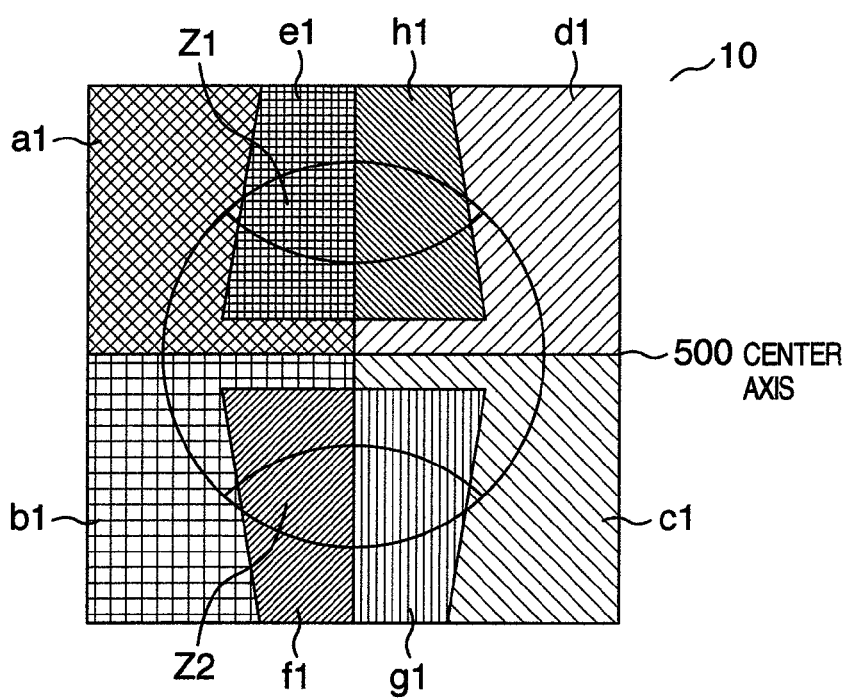
FIG. 8 is a diagram for indicating a light receiving part except for the above-described light receiving part shown in FIG. 7.

It should also be noted that the patterns of the detector 10 have been divided parallel to the radial direction of the tracks of the optical disc in this example. Alternatively, as indicated in FIG. 8, the patterns of the detector 10 may have angles from the radial direction. In other words, as shown in FIG. 8, the patterns of the detector 10 may be alternatively arranged in such a manner that a boundary line between the detection parts "a1" and "e1", a boundary line between the detection lines "b1" and "f1", a boundary line between the detection parts "c1" and "g1", and also, a boundary line between the detection lines "d1" and "h1" are not located parallel to the radial direction of the optical disc, but have predetermined angles respectively with respect to the disc radial direction. In the example shown in FIG. 8, the boundary lines of the respective detection parts have been formed at such angles that the widths of the detection parts "e1", "f1", "g1", and "h1" along the direction of the center axis are gradually narrowed in accordance with such a status that these widths are separated far from the center axis.

Second Embodiment

Figure 9:
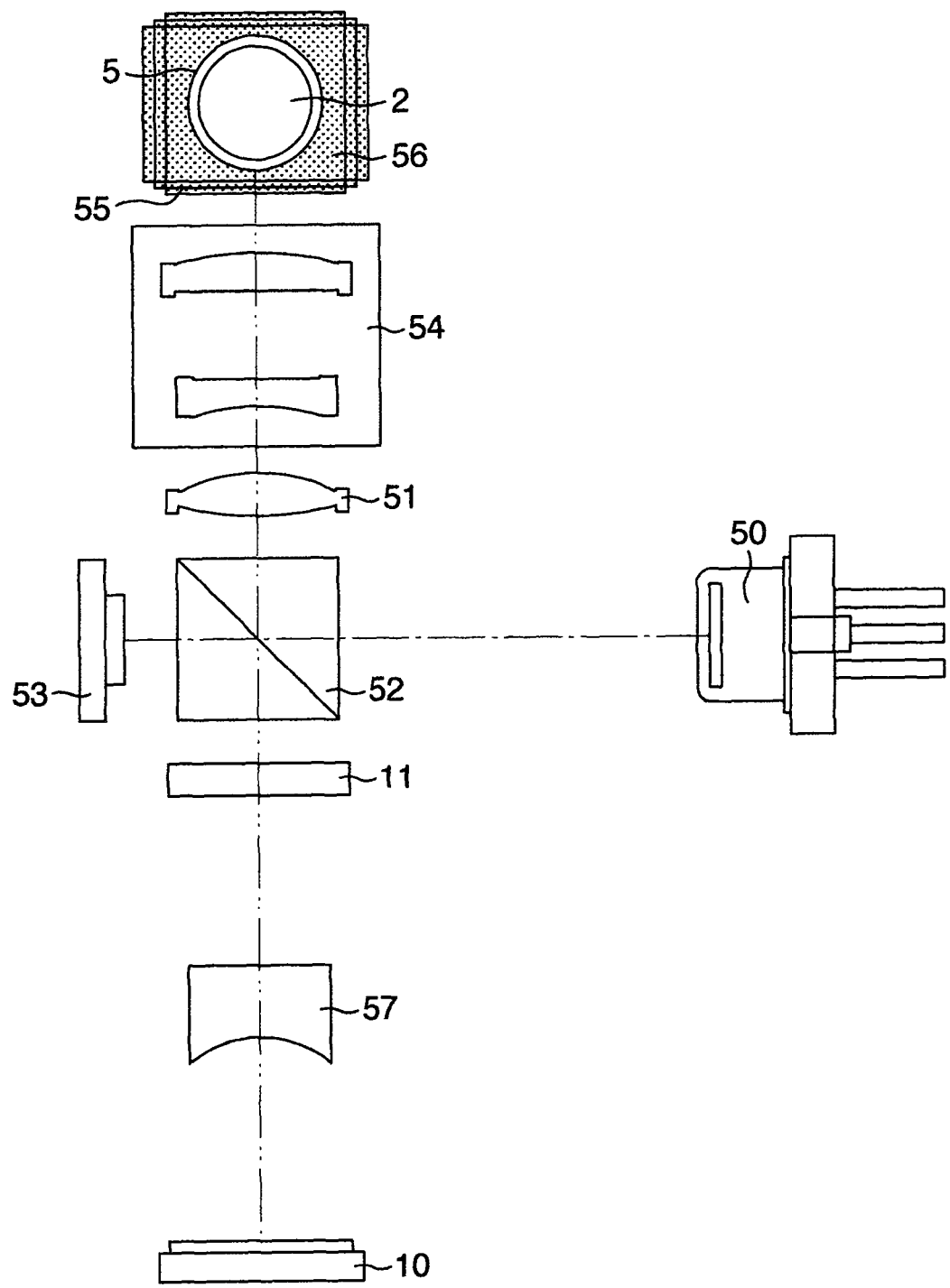
FIG. 9 is an explanatory diagram for explaining an optical system according to a second embodiment of the present invention.

FIG. 9 is a schematic structural diagram for indicating one example as to an optical system of an optical pickup device according to a second embodiment of the present invention. A difference as to the optical system of the second embodiment with respect to the optical system of the first embodiment is featured by that a diffraction grating 11 has been provided in a return path of the optical system. Also, patterns of the detector 10 employed in the second embodiment are featured by that these patterns are different from those of the detector 10 provided in the first embodiment.

Figure 10:
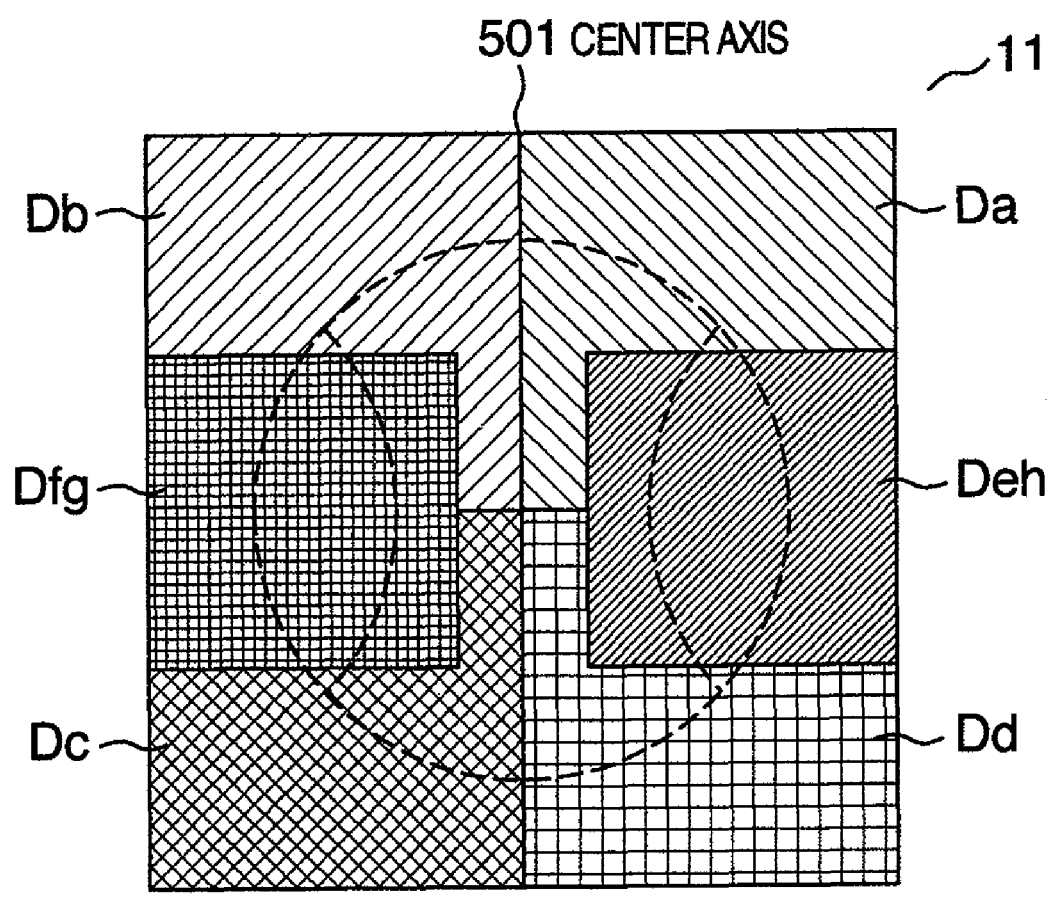
FIG. 10 is a diagram for representing a diffraction grating plane employed in the optical system of the second embodiment.

For instance, the diffraction grating 11 has such a pattern as indicated in FIG. 10. An optical beam entered to the diffraction grating 11 emits zeroth-order light and + first-order light. A spectral ratio of the diffraction grating 11 is assumed as, for example, zeroth-order light: first-order light=7:3.

In the diffraction grating 11 having the patterns indicated in FIG. 10, only the zeroth-order diffraction light among diffraction light diffracted from tracks on an optical disc is irradiated onto a region which is constituted by grating regions "Da" and "Dd" (first region) and grating regions "Db" and "Dc" (third region), whereas the zeroth-order diffraction light, + first-order diffraction light and − first-order diffraction light are irradiated onto a grating region "Deh" (second region) and a grating region "Dfg" (fourth region). A region which is constituted by the grating regions "Da" and "Dc", and another region which is constituted by the grating regions "Db" and "Dd" are located in a line symmetrical manner with respect to a center axis 501. Also, the grating region "Deh" and the grating region "Dfg" are located in a line symmetrical manner with respect to the center axis 501. In this example, the center axis 501 implies such a straight line which passes through a center of the diffraction grating 11 and is located parallel to one edge of the diffraction grating 11. Also, when an optical pickup device has been assembled in an optical disc drive, this center axis 501 has been directed along a direction located perpendicular to a radial direction of tracks of the optical disc. As indicated in FIG. 10, the grating regions "Da", "Db", "Dc", and "Dd" have been arranged in such a manner that these grating regions are contacted to the center axis 501, whereas the grating regions "Deh" and "Dfg" are not contacted to the center axis 501.

Figure 11:
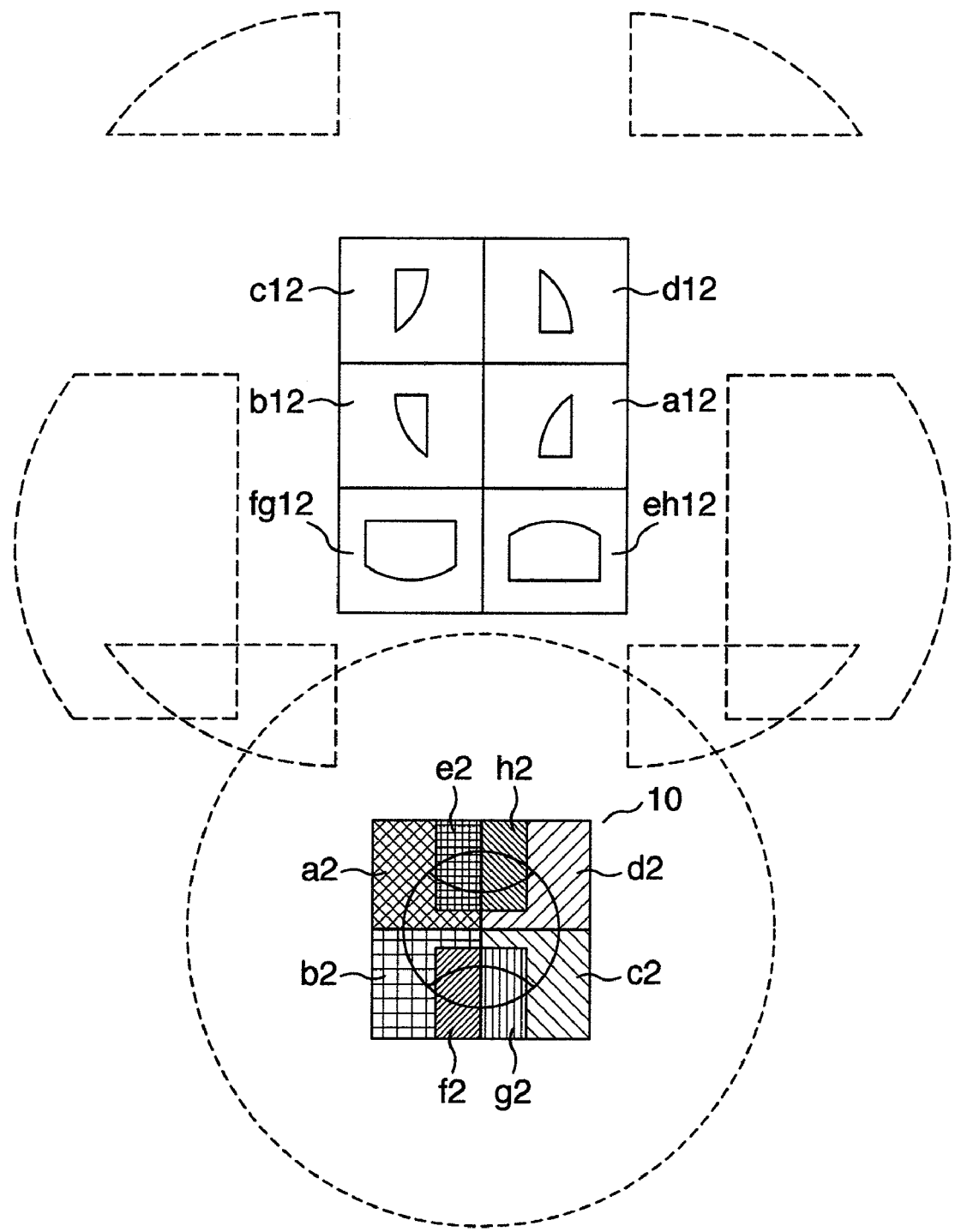
FIG. 11 is a diagram for showing a detecting part employed in the second embodiment.

Also, each of the + first-order light diffracted from the diffraction regions "Da", "Db", "Dc", "Dd", "Deh", and "Dfg" of the diffraction grating 11 enters to detection parts "a12", "b12", "c12", "d12", "eh12", and "fg12" of the detector 10 shown in FIG. 11, respectively, whereas the zeroth-order light diffracted therefrom enters to eight divided detection parts "a2", "b2", "c2", "d2", "e2", "f2", "g2", and "h2", respectively. Signals "A2", "B2", "C2", "D2", "E2", "F2", "G2", "H2", "A12", "B12", "C12", "D12", "EH12", and "FG12", which are acquired from the detection parts "a2", "b2", "c2", "d2", "e2", "f2", "g2", "h2", "a12", "b12", "c12", "d12", "eh12", and "fg12", are calculated based upon the below-mentioned calculation equations (5) so as to produce a focusing error signal (FES), a tracking error signal (TES), and an RF signal.

$$FES=(A2+C2)-(B2+D2)$$

$$TES=(EH12-FG12)-kt2\times\{(A12+D12)-(B12+C12)\}$$

$$RF=A2+B2+C2+D2+E2+F2+G2+H2 \quad \text{[Equation 5]}$$

It should also be noted the "kt2" represents a coefficient which causes that a DC component is not produced in a tracking error signal when an objective lens is shifted. Also, for instance, the detection parts "a2" and "c2" may be connected to each other; the detection parts "b2" and "d2" may be connected to each other; the detection parts "e2" and "g2" may be connected to each other; and the detection parts "f2" and "h2" may be connected to each other.

As previously described, since the interference regions depending upon the tracks on the optical disc are not detected, the stable focusing error signals can be detected. Also, even when the objective lens is shifted, the interference regions are not detected as the focusing error signals. As a result, even when the objective lens is shifted, the stable detections for the focusing error signals with less leakage-in can be carried out.

As to the tracking error signal, a signal of (EH2−FG2) produces an AC component and a DC component with respect to the shift of the objective lens, whereas another signal of (A2−D2)−(B2+C2) produces only a DC component. As a consequence, even when the objective lens is shifted, such a stable tracking error signal can be obtained by which the DC component is not produced. Also, since the detection parts for detecting the tracking error signals are constructed in such a manner that stray light produced from other layers do not enter to these detection parts, a variation of the tracking error signals can be largely suppressed.

Since the above-described structure is employed, stable focusing error signals and stable tracking error signals can be detected.

Figure 12A:
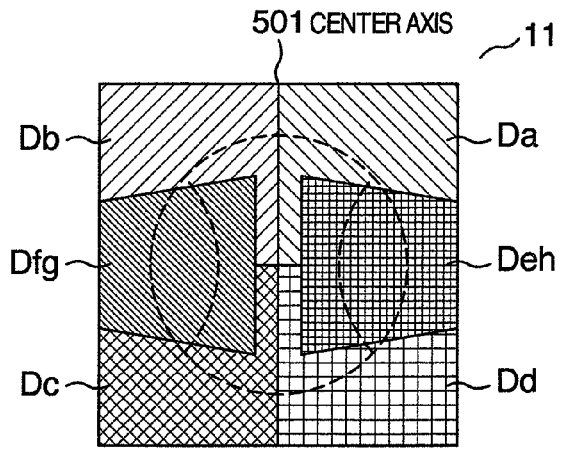
FIG. 12A to FIG. 12C are diagrams for indicating diffraction grating planes except for the above-described diffraction grating plane of FIG. 10.
Figure 12B:
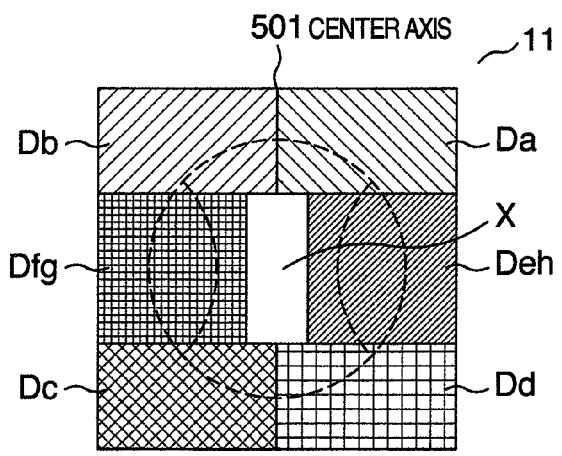
Figure 12C:
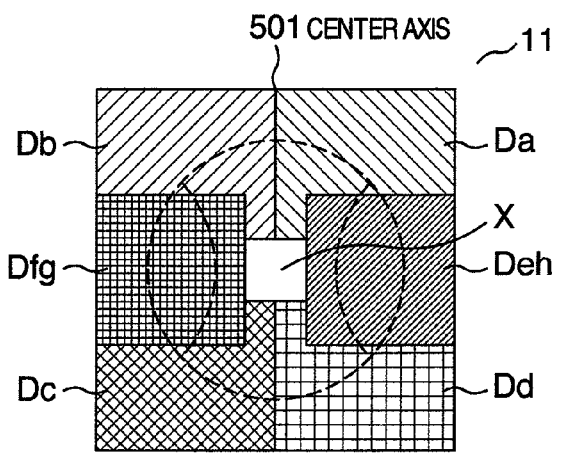

It should also be noted that the patterns of the detector 10 have been divided parallel to the radial direction of the tracks of the optical disc in this example. Alternatively, as indicated in FIG. 12A, patterns of the diffraction grating 11 may have angles from the radial direction of the optical disc, being not parallel to the radial direction thereof. Also, as represented in FIG. 12B and FIG. 12C, patterns of diffraction gratings having "X" regions (fifth regions) may be alternatively employed. Moreover, the above-described spectral ratio of the diffraction grating 11 may merely constitute a reference value. Accordingly, other spectral ratio may be alternatively employed. Also, although the + first-order light has been employed in the above-explained example, − first-order light may be alternatively employed.

Third Embodiment

Figure 13:
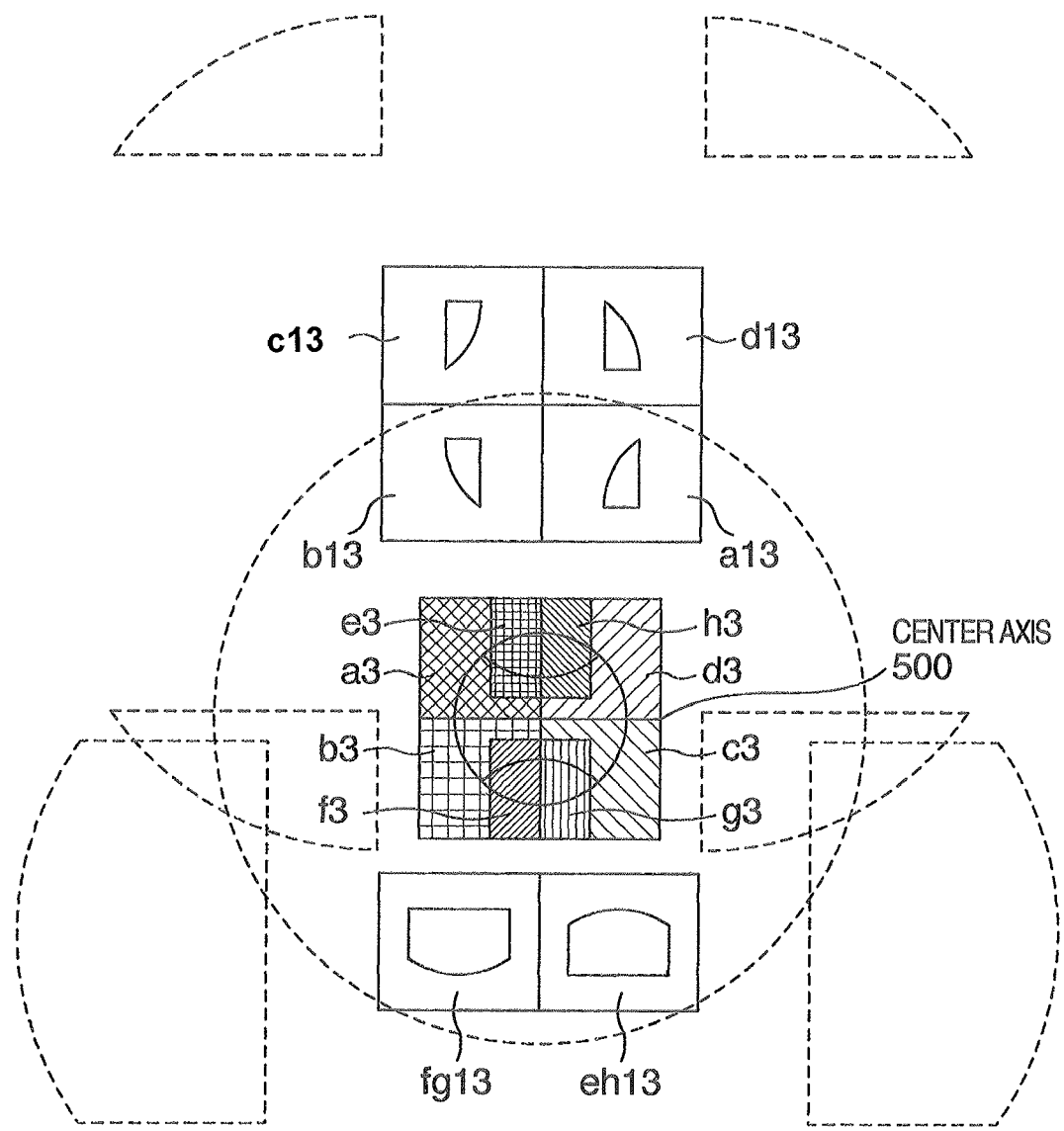
FIG. 13 is a diagram for showing a detecting unit according to a third embodiment of the present invention.

FIG. 13 is a schematic structural diagram for showing one example as to a detector of an optical pickup device according to a third embodiment of the present invention. While an optical system of the third embodiment is similar to the optical system of FIG. 9, the third embodiment is featured to have such a different structure that the diffraction grating 11 provided in the return path of the optical system corresponds to a polarized diffraction grating, which is different from that of the second embodiment. Also, patterns of the detector 10 of the third embodiment are different from those of the second embodiment.

While the polarized diffraction grating 11 has such patterns as shown in, for example, FIG. 10 and FIG. 12A to FIG. 12C, an optical beam entered to the polarized diffraction grating 11 is emitted as transmitted light, + first-order diffracted light, and − first-order light in response to polarization directions thereof. Furthermore, a spectral ratio may be changed based upon a rotation angle of the polarized diffraction grating 11 along an optical axis direction. In this example, it is so assumed that the spectral ratio corresponds to such a rotation angle by which, for example, transmitted light: + first-order light (otherwise, − first-order light)=7:3. It is further assumed that regions "Da", "Db", "Dc" and "Dd" of the polarized diffraction grating 11 emit the + first-order light, whereas regions "Deh" and "Dfg" of the polarized diffraction grating 11 emit the − first-order light. In addition, each of the + first-order light (or − first-order light) diffracted from the regions "Da", "Db", "Dc", "Dd", "Deh", and "Dfg" of the polarized diffraction grating 11 enters to detection parts "a13", "b13", "c13", "d13", "eh13", and "fg13" of the detector shown in FIG. 13, respectively, whereas the transmitted light enters to the eight divided detection parts "a3", "b3", "c3", "d3", "e3", "f3", "g3", and "h3" of the detector 10.

Signals "A3", "B3", "C3", "D3", "E3", "F3", "G3", "H3", "A13", "B13", "C13", "D13", "EH13", and "FG13", which are acquired from the detection parts "a3", "b3", "c3", "d3", "e3", "f3", "g3", "h3", "a13", "b13", "c13", "d13", "eh13" and "fg13" of the detector 10 are calculated based upon the below-mentioned calculation equations (6) so as to produce a focusing error signal (FES), a tracking error signal (TES), and an RF signal.

$$FES=(A3+C3)-(B3+D3)$$

$$TES=(EH13-FG13)-kt3\times\{(A13+D13)-(B13+C13)\}$$

$$RF=A3+B3+C3+D3+E3+F3+G3+H3 \quad \text{[Equation 6]}$$

It should also be noted that "kt3" represents a coefficient which causes that a DC component is not produced in a tracking error signal when an objective lens is shifted. Also, for instance, the detection parts "a3" and "c3" may be connected to each other; the detection parts "b3" and "d3" may be connected to each other; the detection parts "e3" and "g3" may be connected to each other; and the detection parts "F3" and "h3" may be connected to each other.

When a tracking error signal is detected, such a polarization characteristic is utilized in that two sets of linear polarized light intersected perpendicular to each other do not interfere with each other. For instance, while the zeroth-order light shown in FIG. 13 enters to the detection parts "a13", "b13", "fg13", and "eh13" of the detector 10, the polarization of the transmitted light is intersected perpendicular to that of the + first-order diffracted light, and the polarization of the transmitted light is intersected perpendicular to that of the − first-order diffracted light. As a result, interference does not occur, but stable tracking error signals can be detected. Also, since the detection parts are set close to each other, the entire detector 10 may be made compact. As a consequence, not only cost of components may be reduced, but also both the detector 10 and the diffraction grating 11 may be adjusted in a simple manner. Accordingly, it is possible to avoid the cost-up aspect caused by the adjustment.

Since the above-described structure is employed, the stable focusing error signals and the stable tracking error signals can be detected.

It should also be understood that in this third embodiment, the spectral ratio of the polarized diffraction grating 11 based upon the rotation angle thereof along the optical axis direction is merely given as a reference value, and thereof, other spectral ratios other than the above-described spectral ratio may be alternatively employed.

Fourth Embodiment

Figure 14:
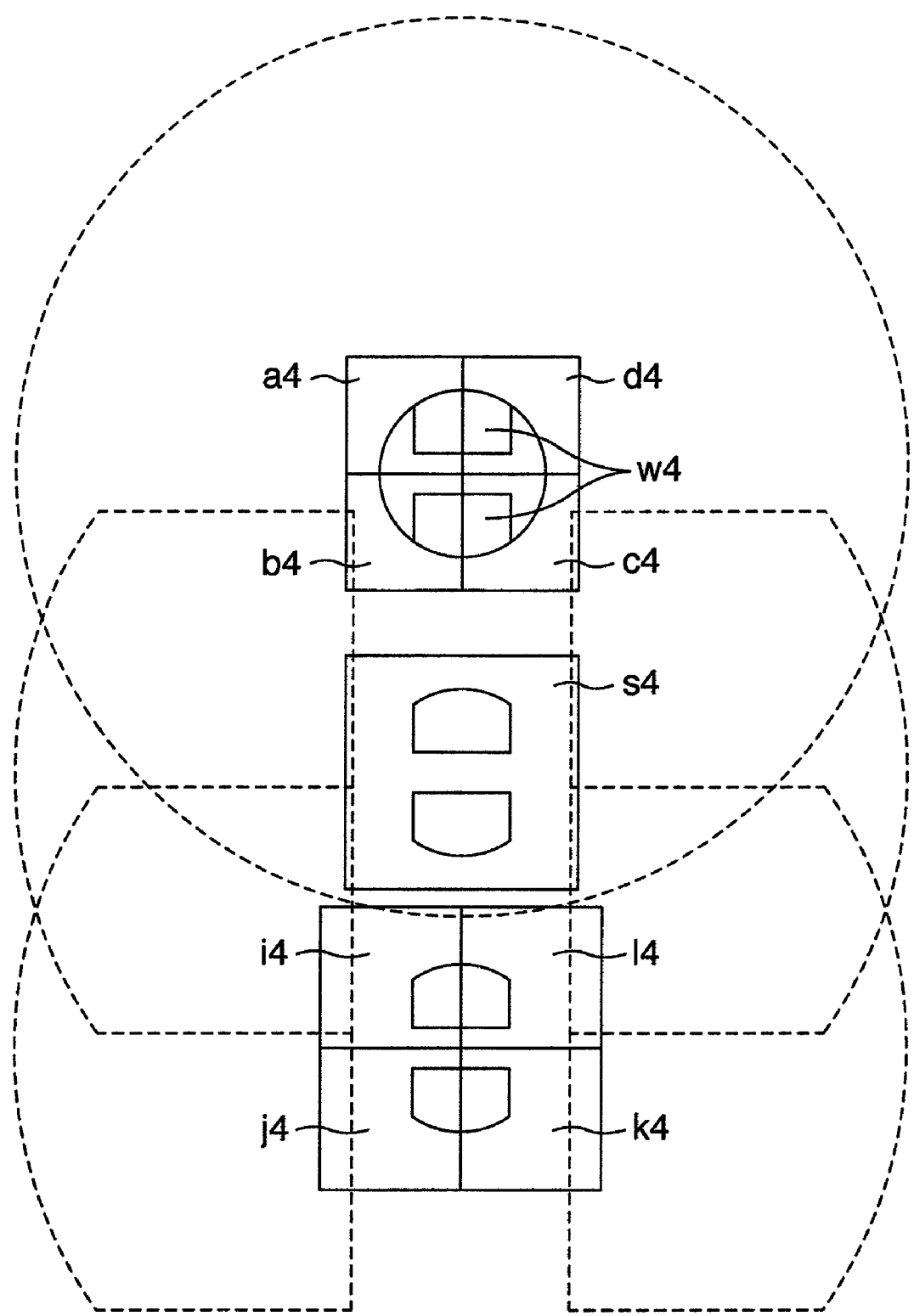
FIG. 14 is a diagram for representing a detecting unit according to a fourth embodiment of the present invention.

FIG. 14 is a schematic structural diagram for showing one example as to a detector of an optical pickup device according to a fourth embodiment of the present invention. While an optical system of the fourth embodiment is similar to the optical system of FIG. 9, the fourth embodiment is featured to have such a different structure that the diffraction grating 11 provided in the return path of the optical system corresponds to a blaze diffraction grating, which is different from that of the second embodiment. Also, patterns of the detector 10 of the fourth embodiment are different from those of the second embodiment. The blaze diffraction grating 11 has such patterns as represent in, for instance, FIG. 10 and FIG. 12A to FIG. 12C, while regions "Dfg" and "Deh" are made in the grating shapes, and other regions are not made in the grating shapes. As a consequence, optical beams entered to the regions other than the above-described regions "Dfg" and "Deh" directly pass through these regions. In contrast thereto, optical beams entered to the regions "Dfg" and "Deh" are diffracted therefrom. In this example, it is so assumed that a spectral ratio of the regions "Dfg" and "Deh" is defined as, for example, zeroth-order light: − first-order light: − second-order light=20:54:20. Also, the − first-order light diffracted from the regions "Dfg" and "Deh" of the blaze diffraction grating 11 enters to a detection part "s4" of the detector 10 shown in FIG. 14, and the − second-order light enters to detection parts "i4", "j4", "k4", and "l4." Then, the light of the regions other than the regions "Dfg" and "Deh" directly passes therethrough and enters to detection parts "a4", "b4", "c4" and "d4." Signals "A4", "B4", "C4", "D4", "I4", "J4", "K4", "L4", and "S4" acquired from the detection parts "a4", "b4", "c4", "d4". "i4", "k4", "l4", and "s4" of the detector 10 are calculated based upon the below-mentioned calculation equations (7) so as to produce a focusing error signal (FES), a tracking error signal (TES), and an RF signal.

$$FES=(A4+C4)-(B4+D4)$$

$$TES=\{(A4+D4)-(B4+C4)\}-kt4\times\{(I4+L4)-(J4+K4)\}$$

$$RF=A4+B4+C4+D4+S4 \quad \text{[Equation 7]}$$

It should also be noted that "kt4" represents a coefficient which causes that a DC component is not produced in a tracking error signal when an objective lens is shifted.

The tracking error signal is detected based upon the detection signals acquired from the detection parts "a4", "b4", "c4", and "d4" of the detector 10, and also, the detection parts "I4", "J4", "K4", and "L4." In this example, although the optical beams entered to the detection parts "a4", "b4", "c4", and "d4" overlap with stray light on the detector 10, since light amounts of signal light are larger than a light amount of the stray light, there is substantially no variation in the tracking error signals. Also, the signal light does not overlap with the stray light on the detection parts "I4", "J4", "K4", and "L4", so that the variation of the tracking error signals does not occur.

The focusing error signal is detected by the detection parts "a4", "b4", "c4", and "d4." On these detection parts, a light amount of a region "w1" including the interference regions depending upon the tracks on the optical disc is small. As a result, leakage-in of the focusing error signal can be reduced.

Since the above-described structure is employed, the stable focusing error signals and the stable tracking error signals can be detected.

It should also be understood that in this fourth embodiment, the spectral ratio of the blaze diffraction grating 11 is merely given as a reference value, and therefore, other spectral ratios other than the above-described spectral ratio may be alternatively employed. Although the − first-order light has been employed in the above explanation, + first-order light may be alternatively employed.

Fifth Embodiment

Figure 15:
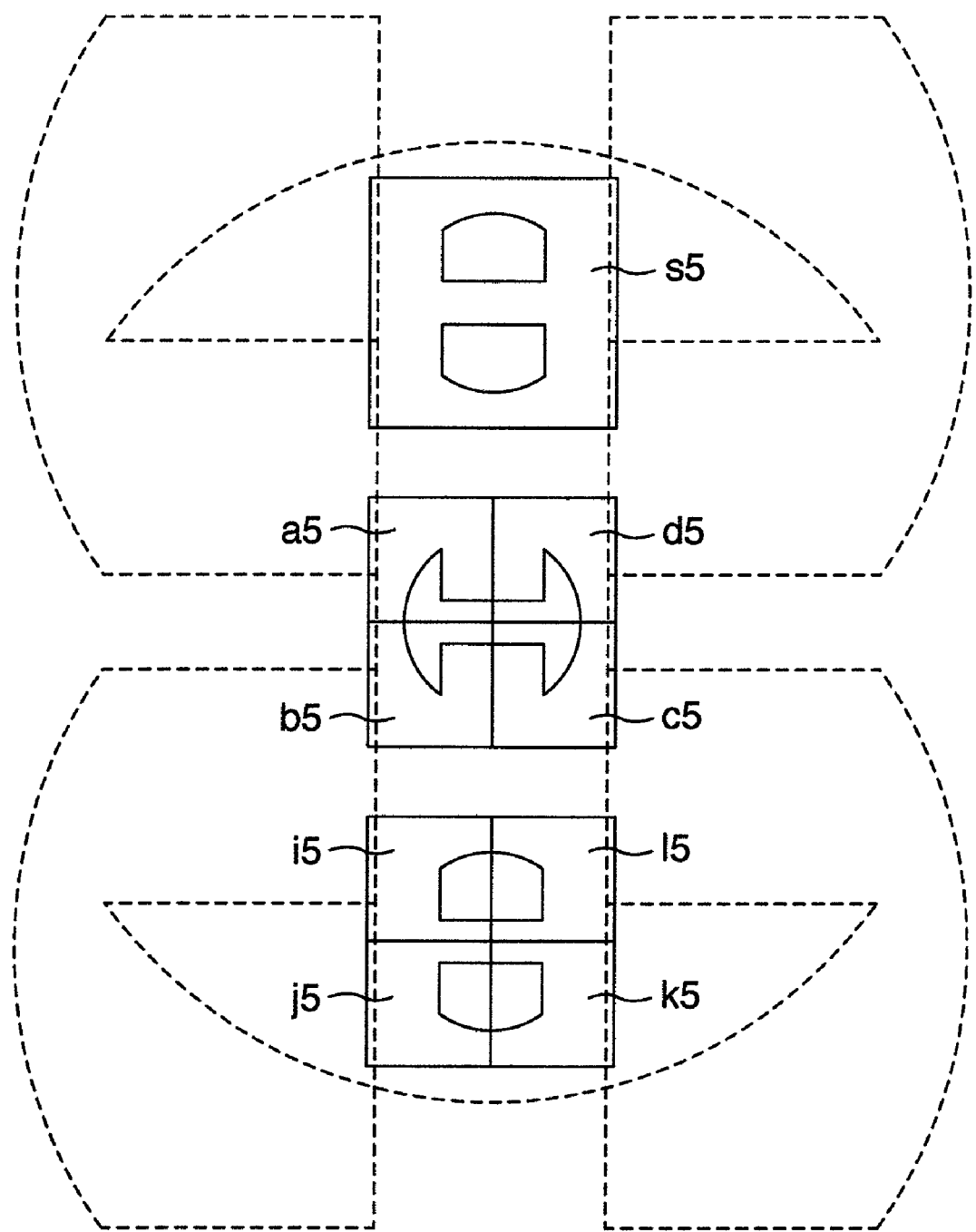
FIG. 15 is a diagram for showing a detecting unit according to a fifth embodiment of the present invention.

FIG. 15 is a schematic structural diagram for showing one example as to a detector of an optical pickup device according to a fifth embodiment of the present invention. While an optical system of the fifth embodiment is similar to the optical system of FIG. 9, the fifth embodiment is featured to have such a different structure that the diffraction grating 11 provided in the return path of the optical system is an integral type optical element made of a polarized diffraction grating and a partial wave plate, which is different from that of the second embodiment. Also, patterns of the detector 10 of the third embodiment are different from those of the second embodiment.

Figure 16:
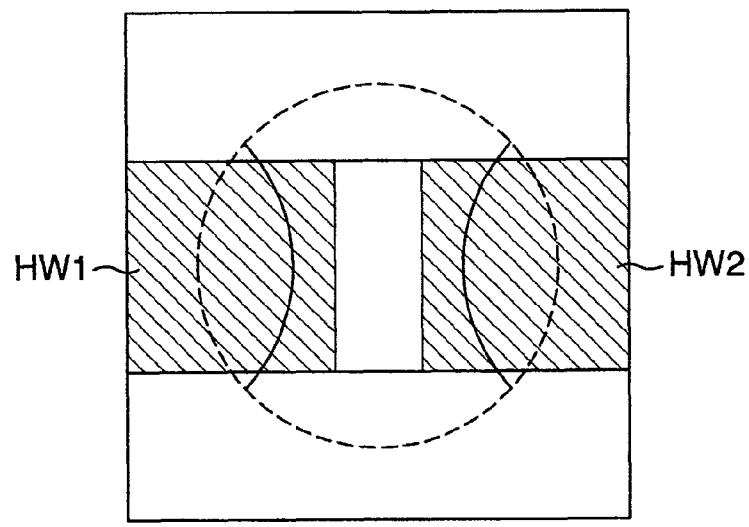
FIG. 16 is a diagram for illustratively showing a partial wave plate employed in an optical system of the fifth embodiment of the present invention.

The partial wave plate of the diffraction grating 11 has such a pattern as shown in, for example, FIG. 16. The partial wave plate has been constructed as follows: That is, while regions "HW1" and "HW2" constitute ½ wave plates (half wave plates), polarization of optical beams passed through these regions "HW1" and "HW2" intersect substantially perpendicular to polarization of optical beams passed through other regions. Also, the polarized diffraction grating constitutes such a diffraction grating which diffracts only polarized light converted by the half wave plates of the regions "HW1" and "HW2." In this fifth embodiment, it is so assumed that a spectral ratio of the polarized diffraction grating is defined as zeroth-order light: + first-order light: − first-order light=0:7:3.

The + first-order light diffracted from the regions "HW1" and "HW2" of the partial wave plate of the diffraction grating 11 enters to a detection part "s5" of the detector 11 shown in FIG. 15, wherein the − first-order light enters to detection parts "i5", "j5", "k5", and "l5." Then, light of regions other than the regions "HW1" and "HW2" directly passes therethrough, and enters to detection parts "a5", "b5", "c5", and "d5" of the detector 10.

Signals "A5", "B5", "C5", "D5", "I5", "J5", "K5", "L5", and "S5" acquired from the detection parts "a5", "b5", "c5", d5", "i5", "j5", "k5", "l5", and "s5" of the detector 10 are calculated based upon the below-mentioned calculation equations (8) so as to produce a focusing error signal (FES), a tracking error signal (TES), and an RF signal.

FES=(A5+C5)−(B5+D5)

TES=(EH15−FG15)−kt5×{(A15+D15)−(B15+C15)}

RF=A5+B5+C5+D5+E5+F5+G5+H5 [Equation 8]

It should also be noted that "kt5" represents a coefficient which causes that a DC component is not produced in a tracking error signal when an objective lens is shifted.

The tracking error signal is detected based upon the detection signals acquired from the detection parts "a5", "b5", "c5", and "d5" of the detector 10, and also, the detection parts "I5", "J5", "K5", and "L5." In this example, although signal light of the optical beams entered to the detection parts "a5", "b5", "c5", and "d5" overlaps with stray light on the detector 10, since light amounts of the signal light are larger than a light amount of the stray light, there is substantially no variation in the tracking error signals. Also, although the signal light overlaps with the stray light on the detection parts "I5", "J5", "K5", and "L5", the variation of the tracking error signals does not occur, since the polarized light is intersected perpendicular to the signal light, the variation in the tracking error signals does not occur. Since the above-described structure is made, it is possible to reduce the variation in the tracking error signals.

The focusing error signal is detected by the detection parts "a5", "b5", "c5", and "d5." On these detection parts, the interference regions depending upon the tracks on the optical disc are not detected. As a result, leakage-in of the focusing error signal can be reduced.

Since the above-described structure is employed, the stable focusing error signals and the stable tracking error signals can be detected.

It should also be understood that in this fifth embodiment, the spectral ratio of the polarized diffraction grating 11 is merely given as a reference value, and therefore, other spectral ratios other than the above-described spectral ratio may be alternatively employed. Although the half wave plate has been employed in the above explanation, other wave plates may be alternatively employed. In addition, alternatively, partial polarized light which is not diffracted by the polarized diffraction grating 11 may enter to the detection parts "a5", "b5", "c5" and "d5." Moreover, the wave plate may be alternatively separated from the polarized diffraction grating 11.

Sixth Embodiment

Figure 17:
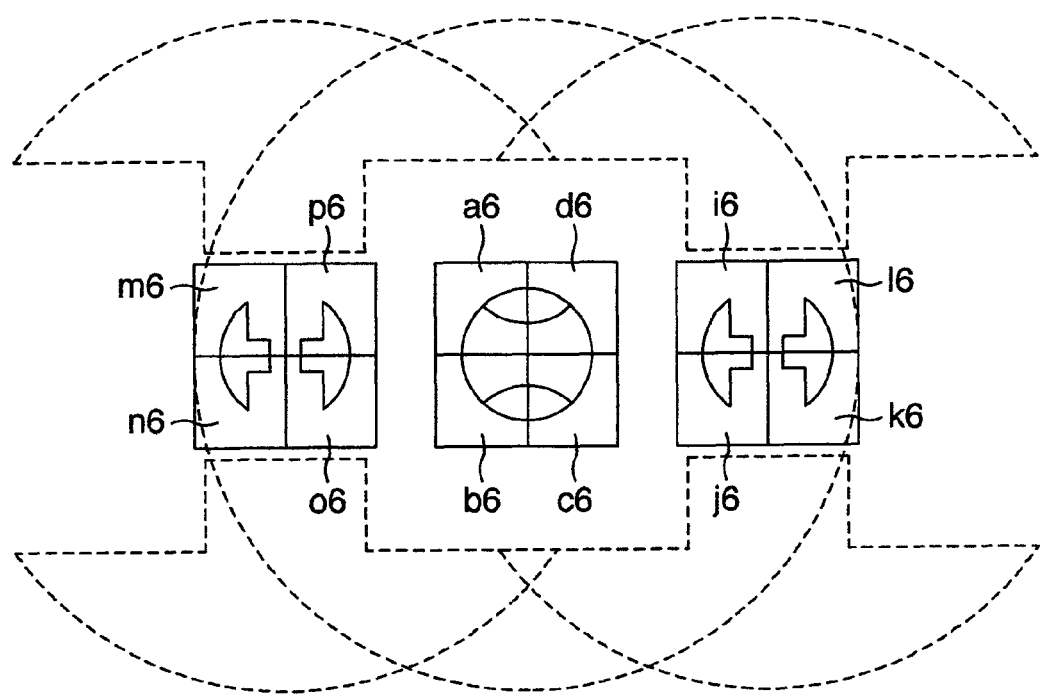
FIG. 17 is a diagram for showing a detecting unit according to a sixth embodiment of the present invention.

FIG. 17 is a schematic structural diagram for showing one example as to a detector of an optical pickup device according to a sixth embodiment of the present invention. While an optical system of the sixth embodiment is similar to the optical system of FIG. 9, the sixth embodiment is featured to have such a different structure that the diffraction grating 11 provided in the return path of the optical system corresponds to a polarized diffraction grating, which is different from that of the second embodiment. Also, patterns of the detector 10 of the sixth embodiment are different from those of the second embodiment.

While the polarized diffraction grating 11 has such patterns as shown in, for example, FIG. 10 and FIG. 12A to FIG. 12C, an optical beam entered to the polarized diffraction grating 11 is changed into transmitted light and diffraction light in response to polarization directions thereof. In this case, since a spectral ratio may be changed based upon a rotation angle of the polarized diffraction grating 11 along an optical axis direction, it is so assumed that the spectral ratio corresponds to such a rotation angle by which, for example, transmitted light: + first-order light: − first-order light=15:1:1. Also, the polarization of the transmitted light has intersected perpendicular to the polarization of the diffraction light.

In this example, as to optical beams diffracted from regions "Da", "Db", "Dc", and "Dd" of the polarized diffraction grating 11, both signal light and stray light of the diffracted light beams do not enter to the detector 10. Also, + first-order light diffracted from regions "Deh" and "Dfg" enters to detection parts "m6", "n6", "o6", and "p6" of the detector 10, whereas − first-order light enters to detection parts "i6", "j6", "k6", and "l6" thereof. Furthermore, such optical beams which have not been diffracted by the polarized diffraction grating 11 enter to detection parts "a6", "b6", "c6", and "d6" of the detector 10.

Signals "A6", "B6", "C6", "D6", "I6", "J6", "K6", "L6", "M6", "N6", "O6", and "P6", which are acquired from the detection parts "a6", "b6", "c6", "d6", "i6", "j6", "k6", "l6", "m6", "n6", "o6", and "p6" of the detector 10 are calculated based upon the below-mentioned calculation equations (9) so as to produce a focusing error signal (FES), a tracking error signal (TES), and an RF signal.

$$FES=(A6+C6)-(B6+D6)+kf6\times\{(I6+K6+M6+O6)-(J6+L6+N6+P6)\}$$

$$TES=\{(A6+D6)-(B6+C6)\}-kt6\times\{(I6+L6+M6+P6)-(J6+K6+N6+O6)\}$$

$$RF=A6+B6+C6+D6 \qquad [\text{Equation 9}]$$

It should also be understood that "kt6" represents a coefficient correcting a difference of light amounts which are caused by the spectral ratio of the polarized diffraction grating 11. It should also be noted that "kt6" represents a coefficient which causes that a DC component is not produced in a tracking error signal when an objective lens is shifted. Also, for instance, the detection parts "I6" and "M6" may be connected to each other; the detection parts "J6" and "N6" may be connected to each other; the detection parts "K6" and "O6" may be connected to each other; and the detection parts "L6" and "P6" may be connected to each other.

The tracking error signal is detected based upon the detection signals acquired from the detection parts "a6", "b6", "c6", and "d6" of the detector 10, and also, the detection parts "I6", "J6", "K6", "L6", "M6", "N6", "O6" and "P6." In this example, although signal light of the optical beams entered to the detection parts "a6", "b6", "c6", and "d6" overlap with stray light on the detector 10, since light amounts of the signal light are larger than a light amount of the stray light, there is substantially no variation in the tracking error signals. Also, although the signal light overlaps with the stray light on the detection parts "I6", "J6", "K6", "L6", "M6", "N6", "O6", and "P6", since the polarized light of the signal light has intersected perpendicular to the polarized light of the stray light, the variation in the tracking error signals does not occur. Since such a structure is employed, the variation of the tracking error signals can be reduced.

The focusing error signal is detected based upon the detection signals acquired from the detection parts "a5", "b5", "c5", and "d5" of the detector 10, and also, the detection parts "I6", "J6", "K6", "L6", "M6", "N6", "O6", and "P6." In this example, as to the signals acquired from the detection parts "a6", "b6", "c6", and "d6", leakage-in of the focusing error signal occurs due to the normal astigmatic detection method. However, as to the signals acquired from the detection parts "I6", "J6", "K6", "L6", "M6", "N6", "O6", and "P6", since the interference regions depending upon the tracks on the optical disc are not detected, the leakage-in of the focusing error signal does not occur. As a consequence, as to finally acquired focusing error signals, the leakage-in has been reduced with respect to the normal astigmatic detection method.

Since the above-described structure is employed, stable focusing error signals and stable tracking error signals can be detected.

It should also be understood that in this sixth embodiment, the spectral ratio of the polarized diffraction grating 11 based upon the rotation angle thereof along the optical axis direction is merely given as a reference value, and thereof, other spectral ratios other than the above-described spectral ratio may be alternatively employed.

Seventh Embodiment

Figure 18:
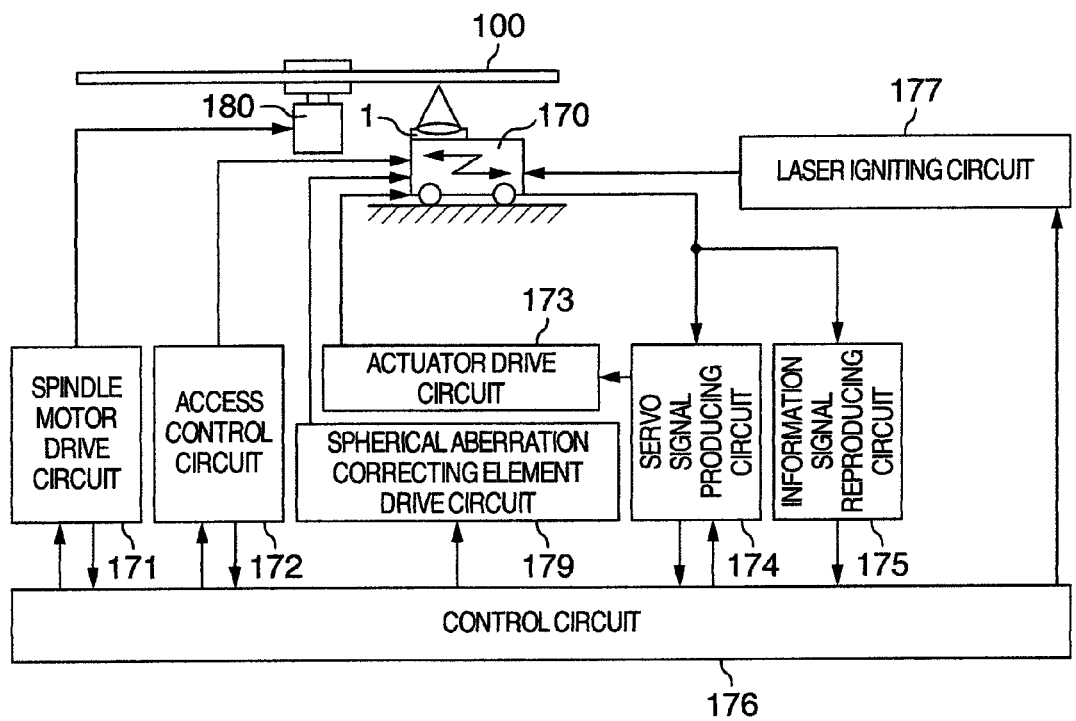
FIG. 18 is an explanatory diagram for explaining an optical information reproducing apparatus according to a seventh embodiment of the present invention.

In a seventh embodiment of the present invention, a description is made of an optical information reproducing apparatus on which the optical pickup device 1 has been mounted. FIG. 18 schematically shows an arrangement of the above-described optical information reproducing apparatus. In the optical information reproducing apparatus, such a mechanism 170 has been provided by which the optical pickup device 1 can be driven along the radial direction of the optical disc 100, while the above-described mechanism is positionally controlled in response to an access control signal supplied from an access control circuit 172.

A predetermined laser driving current is supplied from a laser igniting circuit 177 to a semiconductor laser element (not shown) provided in the optical pickup device 1, and laser light having a predetermined light amount is emitted from the semiconductor laser element in response to a reproducing operation. Alternatively, the laser igniting circuit 177 may be assembled in the optical pickup device 1.

A detection signal outputted from a photodetector (not shown) employed in the optical pickup device 1 is supplied to both a servo signal producing circuit 174 and an information signal reproducing circuit 175. In the servo signal producing circuit 174, servo signals such as a focusing error signal, a tracking error signal, and a tilt control signal are produced based upon the detection signal outputted from the above-described photodetector. The servo signals are supplied from the servo signal producing circuit 174 via an actuator drive circuit 173 so as to drive an actuator (not shown) employed in the optical pickup device 1, so that the actuator controls positions of the objective lens (not shown).

The above-described information signal reproducing circuit 175 reproduces an information signal which has been recorded on the optical device 100 based upon the signal derived from the photodetector.

A certain signal among the signals obtained from the servo signal producing circuit 174 and the information signal reproducing circuit 175 is supplied to a control circuit 176. While a spindle motor drive circuit 171, the access control circuit 172, the servo signal producing circuit 174, the laser igniting circuit 177, a spherical aberration correcting element drive circuit 179, and the like have been connected to the above-described control circuit 176, under control of the above-described control circuit 176, the spindle motor drive circuit 171 may control rotations of a spindle motor 180 which rotates the optical disc 100; the access control circuit 172 may control access directions and access positions of the optical pickup device 100; the servo signal producing circuit 174 may perform servo control operations with respect to the objective lens; the laser igniting circuit 177 may control a light emission amount of the semiconductor laser element employed in the optical pickup device 1; the spherical aberration correcting element drive circuit 179 may correct spherical aberration caused by a difference in thickness of disc plates of optical discs.

Eighth Embodiment

Figure 19:
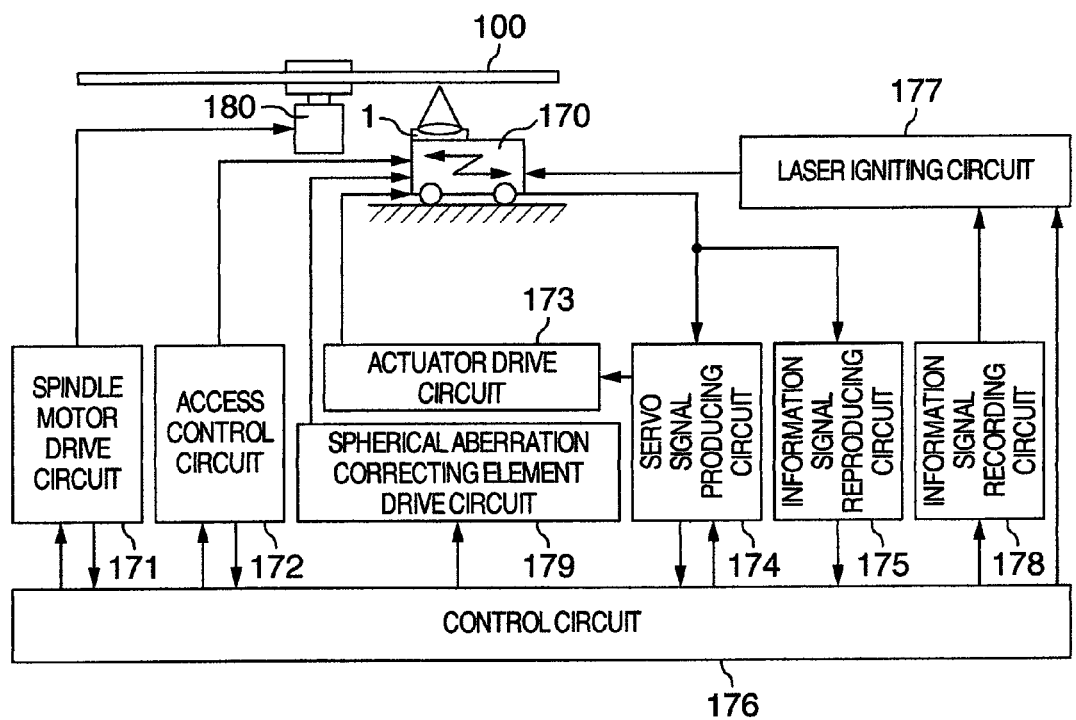
FIG. 19 is an explanatory diagram for explaining an optical information recording/reproducing apparatus according to an eighth embodiment of the present invention.

In an eighth embodiment of the present invention, a description is made of an optical information recording/reproducing apparatus (optical disc apparatus) on which the optical pickup device 1 has been mounted. FIG. 19 schematically shows an arrangement of the above-described optical information recording/reproducing apparatus. This optical information recording/reproducing apparatus has the below-mentioned technical different point from that of the above-explained optical information reproducing apparatus shown in FIG. 18: That is, the below-mentioned function has been additionally provided in this optical information recording/reproducing apparatus in such a manner that an information signal recording circuit 178 is provided between the control circuit 176 and the laser igniting circuit 177, and thus, the laser igniting circuit 177 performs an ignition control operation based upon a recording control signal supplied from the information signal recording circuit 178 so as to write desirable information in the optical disc 100.

While the various sorts of embodiments related to the optical pickup device and the optical disc apparatus according to the present invention have been described, the present invention is not limited only to the above-described embodiments, but may be modified, changed, and substituted without departing from the technical scope and spirit of the present invention.

The invention claimed is:

1. An optical pickup device comprising:
   a semiconductor laser element;
   an objective lens which collects optical beams emitted from said semiconductor laser element so as to irradiate the collected optical beam onto an optical disc;
   an actuator which moves said objective lens in order that said collected optical beam is irradiated onto a predetermined position on said optical disc;
   a diffraction grating which diffracts said optical beam diffracted from said optical disc; and
   a photodetector which receives said optical beam diffracted by said diffraction grating; wherein:
   said diffraction grating includes five regions comprising a first region, a second region, a third region, a fourth region, and a fifth region;
   the first region and the third region are located in a line symmetrical manner with respect to a center axis of said diffraction grating;
   the second region and the fourth region are located in a line symmetrical manner with respect to the center axis of said diffraction grating;
   even when the second region and the fourth region are separated from said center axis of the diffraction grating, widths of both said second region and said fourth region are equal to each other, or said widths thereof gradually become narrower in accordance with separation distances from the center axis of the diffraction grating; wherein
   among the diffracted light diffracted from the track on said optical disc, zeroth-order diffracted light enters to the first region and the third region;
   the zeroth-order diffracted light, + first-order diffracted light, and − first-order diffracted light enter to said second region and said fourth region; and wherein:
   a focusing error signal acquired from said optical disc in accordance with an astigmatic detection method is produced based upon signals obtained by detecting said optical beams diffracted from or transmitted through said first region and said third region of said diffraction grating by using said photodetector, and
   said diffraction grating comprises a polarized diffraction grating configured so that linear polarization of the optical beam transmitted through said polarized diffraction grating intersects substantially perpendicular to linear polarization of the optical beam diffracted from said polarized diffraction grating.

2. An optical pickup device as claimed in claim 1 wherein:
   said first region and said third region of the diffraction grating are made in contact to said center axis of the diffraction grating; and
   said first region, said second region, said third region, and said fourth region of the diffraction grating are divided in a line symmetrical manner with respect to an axis located substantially perpendicular to said center axis.

3. An optical pickup device as claimed in claim 1 wherein:
   said diffraction grating is a polarized diffraction grating which is blazed.

4. An optical pickup device as claimed in claim 1 wherein:
   said polarized diffraction grating is made by stacking wave plates on a plane of the diffraction grating;
   light entered to said first region and said third region passes therethrough;
   light entered to said second region and said fourth region is diffracted therefrom; and
   linear polarization of the optical beam passed through both said first region and said third region intersects perpendicular to linear polarization of the optical beam diffracted from both said second region and said fourth region.

5. An optical disc apparatus, wherein:
   an optical pickup device which is comprised of: a semiconductor laser element; an objective lens which collects optical beams emitted from said semiconductor laser element so as to irradiate the collected optical beam onto an optical disc; an actuator which moves said objective lens in order that said collected optical beam is irradiated onto a predetermined position on the optical disc; a diffraction grating which diffracts said optical beam diffracted from said optical disc; and a photodetector which receives said optical beam diffracted by said diffraction grating; in which said diffraction grating includes five regions comprising a first region, a second region, a third region, a fourth region, and a fifth region; the first region and the third region are located in a line symmetrical manner with respect to a center axis of said diffraction grating; the second region and the fourth region are located in a line symmetrical manner with respect to the center axis of said diffraction grating; even when said second region and said fourth region are separated from said center axis of the diffraction grating, widths of both said second region and said fourth region are equal to each other, or said widths thereof gradually become narrower in accordance with separation distances from the center axis of the diffraction grating; among the diffracted light diffracted from the track on said optical disc, zeroth-order diffracted light enter to said first region and said third region; the zeroth-order diffracted light, + first-order diffracted light, and − first-order diffracted light enter to the second region and the fourth region; in which a focusing error signal acquired from said optical disc in accordance with an astigmatic detection method is produced based upon signals obtained by detecting said optical beams diffracted from or transmitted through said first region and said third region of said diffraction grating by using said photodetector and in which said diffraction grating comprises a polarized diffraction grating configured so that linear polarization of the optical beam transmitted through said polarized diffraction grating intersects substantially perpendicular to linear polarization of the optical beam diffracted from said polarized diffraction grating;
   a laser igniting circuit which drives said semiconductor laser element in said optical pickup device;

a servo signal producing circuit which produces a focusing error signal and a tracking error signal by employing a signal detected from said photodetector employed in said optical pickup device; and an information signal reproducing circuit which reproduces an information signal recorded on said optical disc are mounted on said optical disc apparatus.

6. An optical pickup device comprising:

a semiconductor laser element;

an objective lens configured to collect optical beams emitted from said semiconductor laser element so as to irradiate the collected optical beam onto an optical disc having two or more recording layers;

an actuator which moves said objective lens in order that said collected optical beam is irradiated onto a predetermined position on said optical disc;

a polarized diffraction grating which diffracts said optical beam diffracted from said optical disc; and a photodetector which receives said optical beam diffracted by said diffraction grating; wherein:

said diffraction grating includes five regions comprising a first region, a second region, a third region, a fourth region, and a fifth region;

the first region and the third region are located in a line symmetrical manner with respect to a center axis of said diffraction grating;

the second region and the fourth region are located in a line symmetrical manner with respect to the center axis of said diffraction grating;

even when the second region and the fourth region are separated from said center axis of the diffraction grating, widths of both said second region and said fourth region are equal to each other, or said widths thereof gradually become narrower in accordance with separation distances from the center axis of the diffraction grating; wherein among the diffracted light diffracted from the track on said optical disc, zeroth-order diffracted light enters to the first region and the third region;

the zeroth-order diffracted light, + first-order diffracted light, and − first-order diffracted light enter to said second region and said fourth region; and wherein:

a focusing error signal acquired from said optical disc in accordance with an astigmatic detection method is produced based upon signals obtained by detecting said optical beams diffracted from or transmitted through said first region and said third region of said diffraction grating by using said photodetector, and further comprising:

wherein the polarized diffraction grating is configured so that linear polarization of the optical beam transmitted through said polarized diffraction grating intersects substantially perpendicular to linear polarization of the optical beam diffracted from the polarized diffraction grating to suppress interaction of the optical beam transmitted through the polarized diffraction grating and the diffracted light from the polarized diffraction grating, and to reduce noise of the focusing error signal caused by a leak-in-component which occurs in the optical disc having two or more recording layers.

7. An optical pickup device as claimed in claim 6 wherein:

said first region and said third region of the diffraction grating are made in contact to said center axis of the diffraction grating; and said first region, said second region, said third region, and said fourth region of the diffraction grating are divided in a line symmetrical manner with respect to an axis located substantially perpendicular to said center axis.

8. An optical pickup device as claimed in claim 6 wherein:

said diffraction grating is a polarized diffraction grating which is blazed.

9. An optical pickup device as claimed in claim 1 wherein:

said polarized diffraction grating is made by stacking wave plates on a plane of the diffraction grating;

light entered to said first region and said third region passes therethrough;

light entered to said second region and said fourth region is diffracted therefrom; and linear polarization of the optical beam passed through both said first region and said third region intersects perpendicular to linear polarization of the optical beam diffracted from both said second region and said fourth region.

* * * * *